(12) United States Patent
Yeh (10) Patent No.: US 8,060,686 B2
(45) Date of Patent: Nov. 15, 2011

(54) METHOD, APPARATUS AND CONTROLLER FOR MANAGING MEMORIES

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 484 days.

(21) Appl. No.: 12/168,279

(22) Filed: Jul. 7, 2008

(65) Prior Publication Data
US 2009/0287876 A1    Nov. 19, 2009

(30) Foreign Application Priority Data
May 16, 2008    (TW) ................................ 97118235 A (51) Int. Cl.
*G06F 13/00* (2006.01)

(52) U.S. Cl. ................... 711/103; 365/230.01; 711/154; 711/202; 711/203

(58) Field of Classification Search ................... 711/103, 711/154, 202, 203; 365/230.01
See application file for complete search history.

(56) References Cited

U.S. PATENT DOCUMENTS

2006/0164907 A1 *    7/2006    Nguyen ................... 365/230.01

\* cited by examiner

*Primary Examiner* — Jae Yu
(74) *Attorney, Agent, or Firm* — J.C. Patents (57) ABSTRACT

A method, an apparatus and a controller for managing memories are provided. In the present invention, a data accessing format of each of the memories is adjusted such that the accessing units for each data accessing operation are unified. A mapping table is then established for recording the adjusted data accessing format. When a data accessing command is received from a host, the mapping table is inquired so as to execute the data accessing command. Accordingly, incompatibility of hardware structures can be resolved, and management of different types of flash memory can be achieved.

19 Claims, 5 Drawing Sheets

METHOD, APPARATUS AND CONTROLLER FOR MANAGING MEMORIES

CROSS-REFERENCE TO RELATED APPLICATION

This application claims the priority benefit of Taiwan application serial no. 97118235, filed on May 16, 2008. The entirety of the above-mentioned patent application is hereby incorporated by reference herein and made a part of this specification.

BACKGROUND OF THE INVENTION

1. Field of the Invention

The present invention relates to a method and a system for managing memories. More particularly, the present invention relates to a memory, an apparatus and a controller for managing multiple kinds of memories.

2. Description of Related Art

With a quick development of digital camera, cell phone and MP3, demand of storage media by customers is increased greatly. Since a flash memory has the advantages of non-volatile, energy saving, small size and none mechanical structure etc., it is suitable to function as a built-in memory for portable products, and especially for portable battery-powered products such as laptop computers or personal digital assistants. Moreover, the flash memory is also suitable to function as a storage medium for memory cards or flash drives. Since the flash drive and the memory card are widely utilized and popular in the market, the flash memory has become a hot product in the electronics industry recently.

The flash memories can be classified into single level cell (SLC) NAND flash memories and multi level cell (MLC) NAND flash memories according to different types of memory cell thereof. The flash memory is substantially divided into a plurality of physical blocks. For simplicity's sake, the physical blocks are referred to as blocks below. Generally, the block is a minimum unit that may be erased within the flash memory. Namely, each block contains a minimum number of memory cells that may be erased together. Each block is generally divided into a plurality of pages, and the page is the minimum unit that may be programmed. In other words, the page is the minimum unit that data may be written on or read from. It should be noted that according to different designs of the flash memory, the minimum programmable unit may also be a sector, namely, the page may be divided into a plurality of the sectors, and the sector is the minimum unit that may be programmed, for example, the SLC NAND flash memory using number of program (NOP) of 4.

However, since hardware structures of the flash memories fabricated by different manufacturers are different, for example, number of pages, number of blocks, number of sectors, error checking and correction (ECC) redundancy area sizes, NOPs, R/W timings and special commands of the flash memories are different, a controller of each flash memory module is limited to connect the flash memories with the same capacity and the same type, so that capacities thereof are limited. For example, if 520 MB memory spaces are required, only two 512 MB flash memories or three 256 MB flash memories can be used, and therefore cost and capacities of the flash memories are wasted.

SUMMARY OF THE INVENTION

Accordingly, the present invention is directed to a method for managing memories, in which by setting all the memories into a compatible format, different types of flash memory can be mixingly managed.

The present invention is directed to a system for managing memories, in which an independent controller is used to manage data accessing operations of the memories, so that incompatibility of hardware structures can be resolved.

The present invention is directed to a controller, which may manage different types of flash memory by recording data accessing formats, command sets and logical address ranges of different memories.

The present invention provides a method for managing memories, adapted to manage a memory module including at least two types of memory, wherein the memories are selected from one of a combination of a block address memory and a SLC flash memory, a combination of a block address memory and a MLC flash memory, a combination of SLC flash memories having a first capacity and a second capacity, and a combination of MLC flash memories having a third capacity and a fourth capacity, wherein the first capacity is not equal to the second capacity and the third capacity is not equal to the fourth capacity. The method includes following steps. First, a data accessing command including a logical address of data to be accessed is received. Next, a memory corresponding to the logical address is identified. Finally, the data accessing command is executed to the memory according to the logical address and the identified memory type.

In an embodiment of the present invention, if the memory module is one of the combination of SLC flash memories having the first capacity and the second capacity, and the combination of MLC flash memories having the third capacity and the fourth capacity, the managing method further includes following steps. First, data accessing formats of the memories are adjusted according to hardware structures of the memories, so as to unify an accessing unit for each data accessing operation. Next, a mapping table is established for recording the adjusted data accessing formats of the memories, and the mapping table is inquired according to the data accessing command, so as to execute the data accessing command.

In an embodiment of the present invention, the step of adjusting the data accessing formats of the memories so as to unify the accessing unit for each data accessing operation includes expanding the memories with relatively small accessing units to be compatible with the memory with a relatively large accessing unit based on a merging approach. If the accessing units of the memories include a 2k page and a 4k page, two 2k pages are then merged into one 4k page, so as to manage the memory having the 2k page accessing unit.

In an embodiment of the present invention, if the memories include the block address memory, the managing method further includes assigning a logical address range to the block address memory to function as a basis for accessing the block address memory.

In an embodiment of the present invention, the step of adjusting the data accessing formats of the memories so as to unify the accessing unit for each data accessing operation includes uniformly setting NOPs of the memories to be 1.

In an embodiment of the present invention, the managing method further includes recording command sets and storage formats of the memories in the mapping table, and inquiring the corresponding command set and the storage format stored in the mapping table to access the memory when the data accessing command is received. Wherein, the command set includes one of cache write, two plane write, special command or combinations thereof, and the storage format includes one of a R/W timing and an ECC redundancy area size or a combination thereof.

In an embodiment of the present invention, the accessing unit includes one of a page, a block and a sector.

The present invention provides a system for managing memories, the system includes a first type memory, a second type memory and a controller. The first type memory and the second type memory include at least two types of memory, wherein the memories are selected from one of a combination of a block address memory and a SLC flash memory, a combination of a block address memory and a MLC flash memory, a combination of SLC flash memories having a first capacity and a second capacity, and a combination of MLC flash memories having a third capacity and a fourth capacity, wherein the first capacity is not equal to the second capacity, and the third capacity is not equal to the fourth capacity. Moreover, the controller is coupled to the first type memory and the second type memory for identifying a memory type according to a logical address indicated by a data accessing command, and executing the data accessing command according to the logical address and the identified memory type.

In an embodiment of the present invention, if the memory module is one of the combination of SLC flash memories having the first capacity and the second capacity, and the combination of MLC flash memories having the third capacity and the fourth capacity, the controller further adjusts the data accessing formats of the first type memory and the second type memory according to hardware structures of the memories, so as to unify an accessing unit for each data accessing operation. Moreover, the controller further establishes a mapping table for recording the adjusted data accessing formats of the memories, and inquires the mapping table according to the data accessing command, so as to execute the data accessing command.

In an embodiment of the present invention, if the first type memory and the second type memory include the block address memory, the block address memory then includes a main memory and a logical addressing controller. Wherein the main memory includes a plurality of blocks for storing data. The logical addressing controller is used for managing data accessing operations of the blocks according to logical addresses of the blocks recorded in a logical address mapping table.

In an embodiment of the present invention, the logical addressing controller finds a block group corresponding to the logical address from the main memory according to the logical address mapping table, wherein the block group includes a plurality of blocks, and finds the block corresponding to the logical address from the block group according to a sub logical address mapping table, so as to execute the data accessing command.

In an embodiment of the present invention, if the first type memory and the second type memory include the block address memory, the controller further assigns a logical address range to the block address memory to function as a basis for accessing the block address memory.

In an embodiment of the present invention, the controller further expands the memories with relatively small accessing units to be compatible with the memory with a relatively large accessing unit based on a merging approach.

In an embodiment of the present invention, if the accessing units of the first type memory and the second type memory are respectively a 2k page and a 4k page, the controller merges two 2k pages into one 4k page for managing the first type memory.

In an embodiment of the present invention, the controller further uniformly sets NOPs of the first type memory and the second type memory to be 1.

In an embodiment of the present invention, the controller further records command sets and storage formats of the first type memory and the second type memory in the mapping table, and inquires the corresponding command set and the storage format stored in the mapping table for accessing the first type memory or the second type memory when the data accessing command is received. Wherein, the command set includes one of cache write, two plane write, special command or combinations thereof, and the storage format includes one of a R/W timing and an ECC redundancy area size or a combination thereof.

In an embodiment of the present invention, the accessing unit includes one of a page, a block and a sector.

In an embodiment of the present invention, pins of the first type memory and the second type memory are the same to that of a flash memory.

The present invention provides a controller including a micro processing unit, a host link interface, a first memory link interface, a second memory link interface and a memory management module. The micro processing unit is used for controlling operations of the controller. The host link interface is coupled to a host and the micro processing unit. The first memory link interface is coupled to a first type memory and the micro processing unit, and the second memory link interface is coupled to a second type memory and the micro processing unit, wherein the first type memory and the second type memory are selected from one of a combination of a block address memory and a SLC flash memory, a combination of a block address memory and a MLC flash memory, a combination of SLC flash memories having a first capacity and a second capacity, and a combination of MLC flash memories having a third capacity and a fourth capacity, wherein the first capacity is not equal to the second capacity, and the third capacity is not equal to the fourth capacity. The memory management module is coupled to the micro processing unit for managing data accessing operations of the first type memory and the second type memory via the micro processing unit, wherein the memory management module identifies a memory type according to a logical address indicated by a data accessing command, and executes the data accessing command according to the logical address and the identified memory type.

In an embodiment of the present invention, if the first type memory and the second type memory is one of the combination of SLC flash memories having the first capacity and the second capacity, and the combination of MLC flash memories having the third capacity and the fourth capacity, the memory management module further adjusts data accessing formats of the first type memory and the second type memory according to hardware structures of the first type memory and the second type memory, so that accessing units for each data accessing operation are unified. Moreover, the memory management module further establishes a mapping table for recording the adjusted data accessing formats of the memories, and inquires the mapping table according to the data accessing command, so as to execute the data accessing command.

In an embodiment of the present invention, if the first type memory and the second type memory include the block address memory, the memory management module then assigns a logical address range to the block address memory to function as a basis for accessing the block address memory.

In an embodiment of the present invention, the memory management module further expands the memories with relatively small accessing units to be compatible with the memory with a relatively large accessing unit based on a merging approach.

In an embodiment of the present invention, if the accessing units of the first type memory and the second type memory are respectively a 2k page and a 4k page, the memory management module merges two 2k pages into one 4k page for managing the first type memory.

In an embodiment of the present invention, the memory management module further uniformly sets NOPs of the first type memory and the second type memory to be 1.

In an embodiment of the present invention, the memory management module further records command sets and storage formats of the first type memory and the second type memory in the mapping table, and inquires the corresponding command set and the storage format stored in the mapping table for accessing the first type memory or the second type memory when the data accessing command is received. Wherein, the command set includes one of cache write, two plane write, special command or combinations thereof, and the storage format includes one of a R/W timing and an ECC redundancy area size or a combination thereof.

In the present invention, a single controller is applied to control different types of flash memory or block address memory. By setting all the memories into a compatible format, and establishing a mapping table in the controller to record information such as data accessing formats, command sets and logical address ranges of the memories, incompatibility of the hardware structure can be resolved and different types of flash memory can be simultaneously managed.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Since different types of flash memory have different hardware structures, to manage the different types of flash memory, all of the flash memories have to be set into compatible formats, and the settings are pre-stored. Thereafter, when a data accessing command is received, the correct data accessing position and data accessing method are then obtained by an inquiry, so that data accessing operations between different types of flash memory can be performed.

Accordingly, the present invention provides a method, a system and a controller for managing different types of memory based on the above concept. To fully convey the concept of the present invention, embodiments are provided below for describing the present invention in detail.

Figure 1:
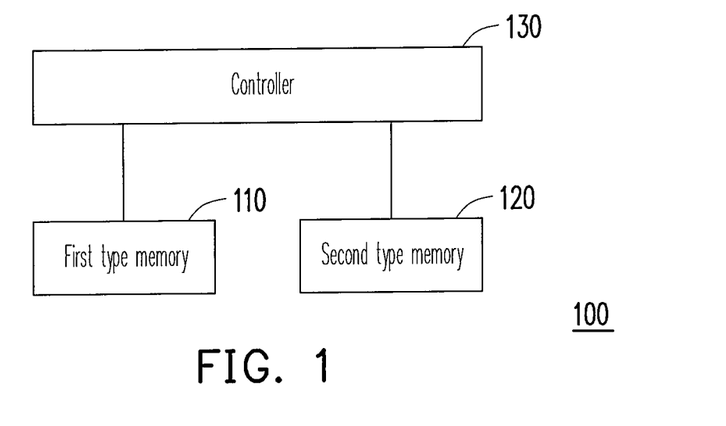
FIG. 1 is a block diagram illustrating a system for managing memories according to an embodiment of the present invention.

FIG. 1 is a block diagram illustrating a system for managing memories according to an embodiment of the present invention. Referring to FIG. 1, the system 100 includes a first type memory 110, a second type memory 120 and a controller 130. The first type memory 110 and the second type memory 120 are, for example, selected from one of a combination of a block address memory and a SLC flash memory, a combination of a block address memory and a MLC flash memory, a combination of SLC flash memories having a first capacity and a second capacity, and a combination of MLC flash memories having a third capacity and a fourth capacity. The memories can be flash memories or block address memories with different capacities, or can be flash memories or block address memories fabricated by different manufacturers. The block address memory refers to a memory containing a controller, in which the controller and the memory can be packaged within a same package or can be independent with each other.

The controller 130 is coupled to the first type memory 110 and the second type memory 120, and is used for identifying a memory type according to a logical address indicated by a data accessing command, and executing the data accessing command according to the logical address and the identified memory type.

To be specific, if the first type memory 110 and the second type memory 120 are two SLC flash memories or two MLC flash memories having different capacities, the controller 130 first adjusts data accessing formats of the first type memory 110 and the second type memory 120 according to the hardware structures of the first type memory 110 and the second type memory 120, so as to unify an accessing unit for each data accessing operation. The adjusted data accessing formats are then stored for further utilization of memory management. On the other hand, if the first type memory 110 and the second type memory 120 include the block address memory (i.e. one of a combination of a block address memory and a SLC flash memory, and a combination of a block address memory and a MLC flash memory), the controller 130 assigns a logical address range to the block address memory to function as a basis for accessing the block address memory. Detail management flow is described in the following embodiment.

Figure 2:
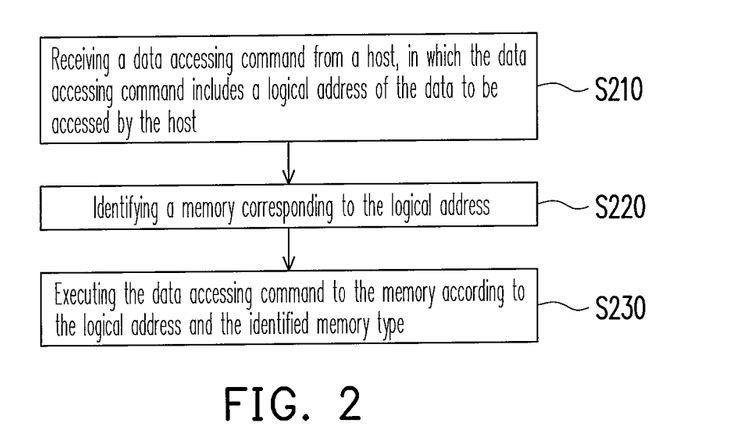
FIG. 2 is flowchart illustrating a method for managing memories according to an embodiment of the present invention.

FIG. 2 is flowchart illustrating a method for managing memories according to an embodiment of the present invention. Referring to FIG. 2, the method of the present embodiment is adapted to the management system of the above embodiment, in which an independent controller is utilized for managing data accessing operations of two or more types of memory. For simplicity's sake, only two types of memory are taken as an example hereinafter.

First, the controller receives a data accessing command from a host, in which the data accessing command includes a logical address of data to be accessed by the host (step S210). Next, a memory corresponding to the logical address is identified (step S220). Finally, the data accessing command is executed to the memory according to the logical address and the identified memory type (step S230). When the memories managed by the controller have different types, the management methods thereof are also different. Accordingly, another embodiment is provided below for detail description.

Figure 3:
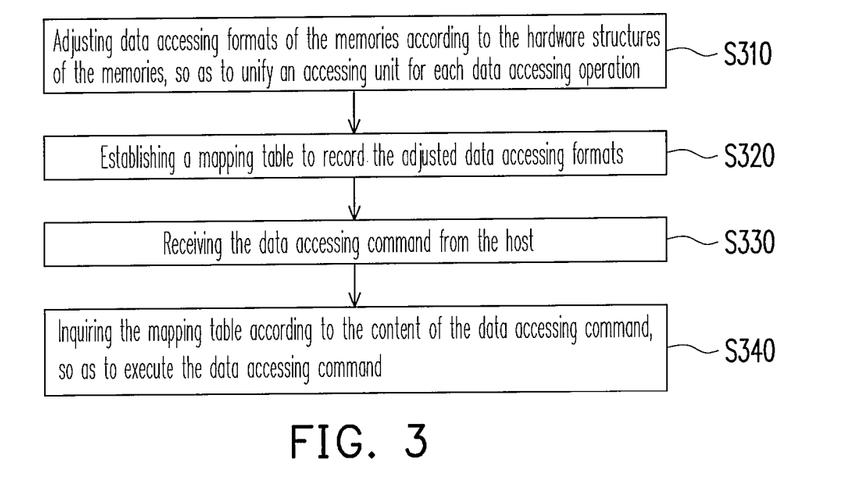
FIG. 3 is a flowchart illustrating a method for managing memories according to another embodiment of the present invention.

FIG. 3 is a flowchart illustrating a method for managing memories according to another embodiment of the present invention. Referring to FIG. 3, the method of the present embodiment is adapted to the management system of the aforementioned embodiment, in which an independent controller is utilized for managing data accessing operations of two SLC flash memories or two MLC flash memories having different capacities.

First, the controller first adjusts data accessing formats of the memories according to the hardware structures of the memories, so as to unify an accessing unit for each data accessing operation (step S310). Meanwhile, a mapping table is established for recording the adjusted data accessing formats (step S320). To be specific, during management of different types of memory, page sizes, block sizes, block numbers and NOPs of the memories may be different, in which the problem of different NOPs can be resolved by applying a least choice thereof, namely, the NOPs of all the memories are uniformly set to 1.

As to the problems of different sizes and numbers of the accessing unit (i.e. a page, a block or a sector), a merging approach is required to expand the flash memories with relatively small accessing units to be compatible with the flash memory with a relatively large accessing unit. For example, if the accessing unit of the first type memory is 2k page, and the accessing unit of the second type memory is 4k page, the controller then merges each two 2k pages of the first type memory into one 4k page for management. Similarly, if the accessing unit of the first type memory is 2k block, and the accessing unit of the second type memory is 4K block, the control then merges each two 2k blocks of the first type memory into one 4K block for management. The 2k page mentioned above refers to a page having 2k+64 bytes, i.e. 2112 bytes, and the 4k page refers to a page having 4k+128 bytes, i.e. 4184 bytes.

Figure 4:
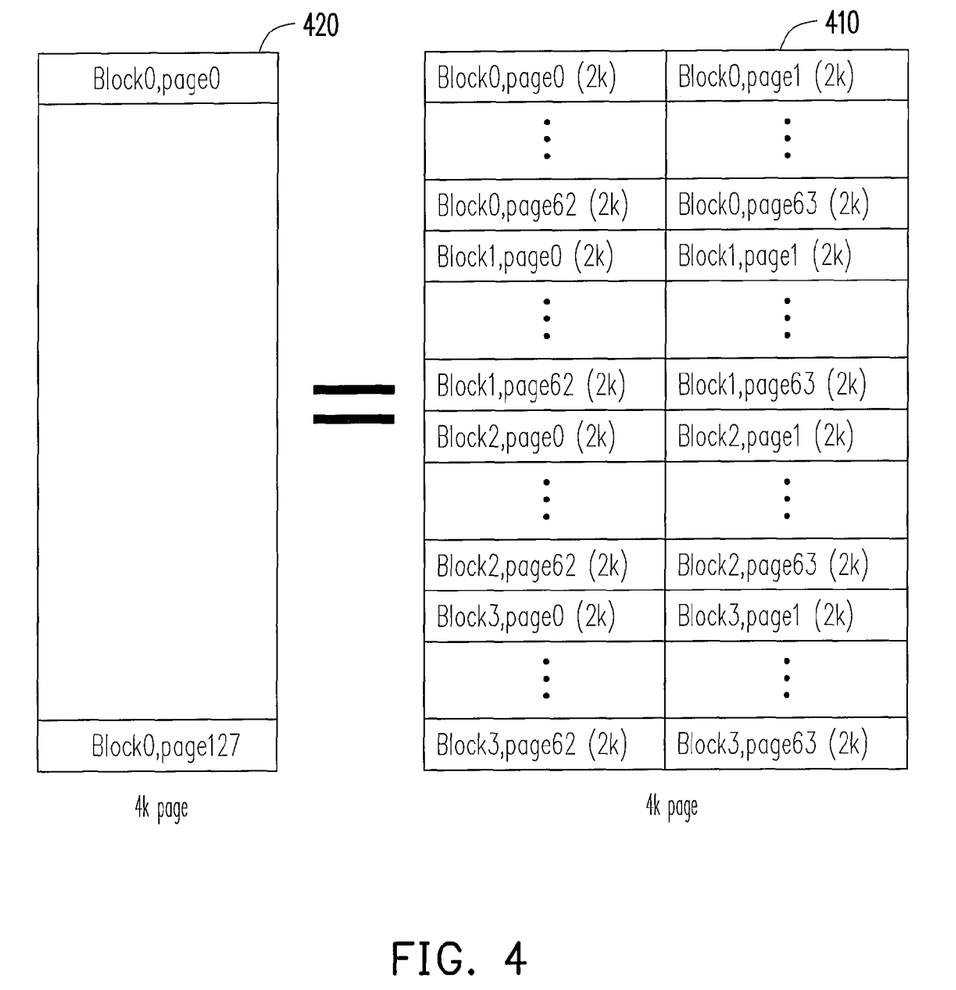
FIG. 4 is a schematic diagram of memory blocks merging according to an embodiment of the present invention.

As described above, the block is a main merging unit, and the controller may adjust the sizes of all the blocks (or virtual blocks) of the flash memories to be the same, so as to facilitate the management. For example, FIG. 4 is a schematic diagram of merging memory blocks according to an embodiment of the present invention. Referring to FIG. 4, in the present embodiment, an independent controller (not shown) is utilized for managing data accessing operations of SLC flash memories 410 and 420, which have different capacities. The SLC flash memory 410 has 64 2k pages (page0~page63), and the SLC flash memory 420 has 128 4k pages (page0~page127).

In order to uniformly manage the above two types of flash memory, in the present embodiment, two 2k pages in the SLC flash memory 410 are merges into one 4k page for management. For example, the page0 and the page1 of a block0 are merged into one 4k page. On the other hand, since number of pages in a block of the SLC flash memory 410 is relatively less, 4 blocks (block0~block3) can be merged for being compatible to the data accessing format of the SLC flash memory 420. As shown in FIG. 4, 4 blocks (respectively containing 64 2k pages) of the SLC flash memory 410 are merged into one block having 128 4k pages.

After the mapping table is established, the controller then receives the data accessing command from the host (step S330), and each time when the controller receives a data accessing command, the controller inquires the mapping table according to the content of the data accessing command, so as to execute the data accessing command (step S340).

It should be noted that beside the problem of different accessing units, incompatibility of different flash memories is also a problem. For example, some flash memories have special functions such as cache write and two plane write, etc., and even if functions of the flash memories are all the same, methods of sending command are different, and therefore a table is required for recording the problem of incompatibility.

Accordingly, the controller can record command sets such as cache write, two plane write and special command, etc., and storage formats such as R/W timing and ECC redundancy area size, etc. into its own storage unit, so as to immediately inquire a corresponding command set and a storage format for accessing the memory when the data accessing command is received.

To be specific, the controller may record the flash memory type corresponding to each of the blocks, and when the block is written or read, the accessing command, R/W timing and ECC redundancy area size corresponding to this flash memory type are then applied, so that the problems caused by different hardware structures can be resolved.

For example, when the flash memories with the accessing units of 2k page and 4k page are mixingly utilized, if data of the 4k page is about to be read, only one read command is required to be executed for reading the data of the 4k page. However, for the flash memory with the accessing unit of the 2k page, two 2k pages then have to be merged into the 4k page, so that when the data of the 4k page is about to be read, two read commands are required to be executed for reading the data of the 4k page. Similar situations are all required to be recorded in the memory type, so as to avoid accessing errors.

It should be noted that in the present embodiment, since the controller adjusts the 2k page accessing unit into the 4k page accessing unit, during management, two 2k pages are then merged into one virtual 4k page. However, since the accessing unit of the 2k page flash memory is still the 2k page with respect to the hardware structure, to confirm that the data accessing command is about to access the 2k page contained in the virtual 4k page, the controller further establishes a sub address mapping table, so that in case of an inconsistency of the accessing unit with respect to a software management and the hardware structure, the correct address can still be accessed as the data accessing command is executed.

According to the above management method, incompatibility of the accessing units caused by different capacities of the memories then can be resolved, so that the flash memories with different capacities and specifications can be simultaneously managed.

It should be noted that in another embodiment of the present invention, if the memories managed by the controller include the block address memory, the logical address has to be reassigned, so that when the controller receives the data accessing command, the controller may select a suitable memory according to the logical address, so as to execute the data accessing command. Accordingly, another embodiment is provided below for further description.

Figure 5:
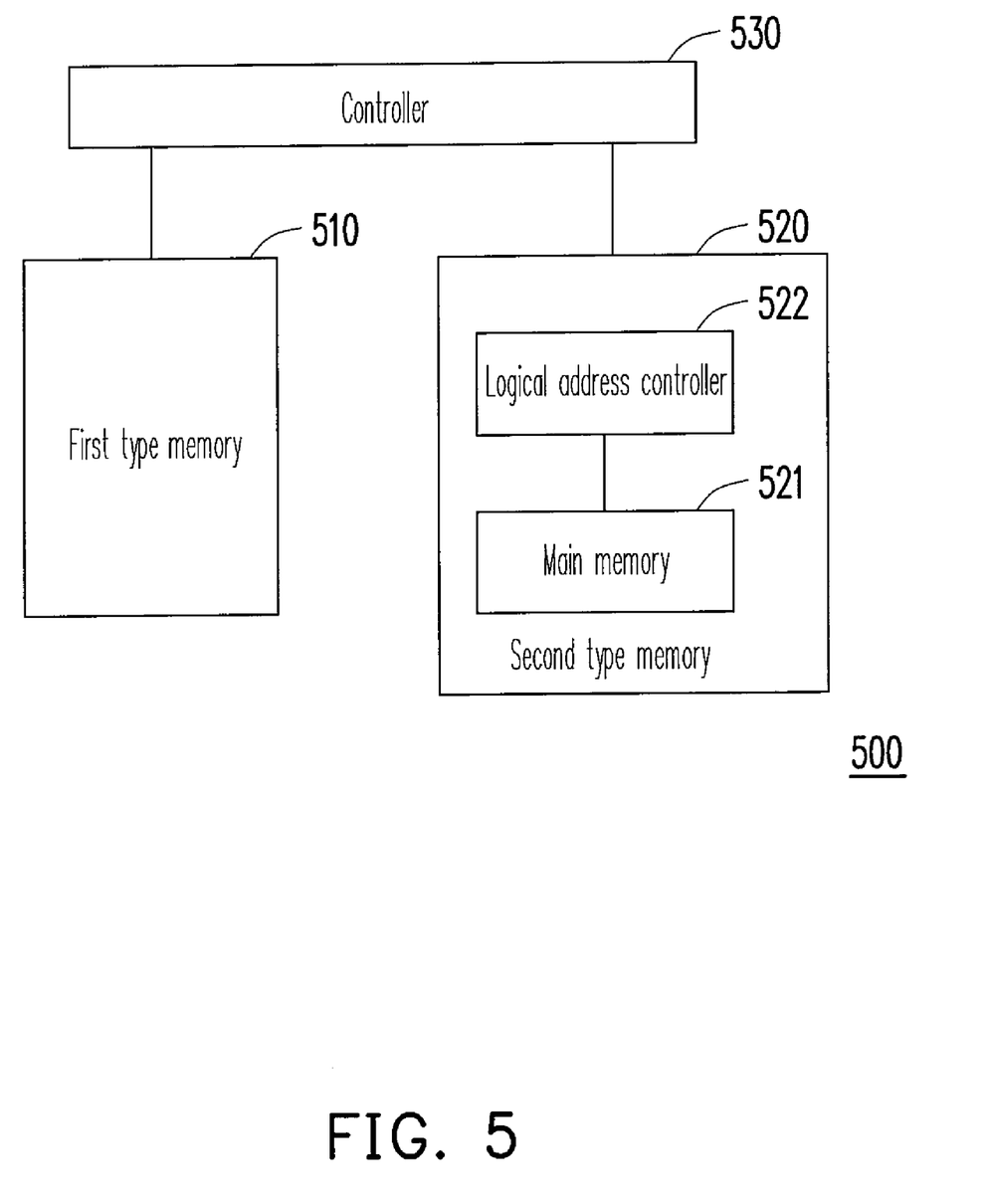
FIG. 5 is a block diagram illustrating a system for managing memories according to another embodiment of the present invention.

FIG. 5 is a block diagram illustrating a system for managing memories according to another embodiment of the present invention. Referring to FIG. 5, the system 500 of the present embodiment includes a first type memory 510, a second type memory 520 and a controller 530. The first type memory 510 is a SLC flash memory, and the second type memory 520 is a block address memory.

Since the block address memory includes a controller itself to manage a memory therein, besides a main memory 521, the second type memory 520 of the present embodiment further includes a logical address controller 522. The main memory 521 is, for example, a MLC flash memory or a SLC flash memory including a plurality of blocks for storing data.

A logical address mapping table is pre-established in the logical address controller 522, and logical addresses of the blocks in the main memory 521 are recorded in the logical address mapping table. Therefore, each time when the logical address controller 522 receives the data accessing command, the position where data to be read or written is then found by inquiring the logical address mapping table, so as to manage the data accessing operations of the blocks of the block address memory.

On the other hand, the controller 530 further assigns a logical address range to the second type memory 520 (i.e. the block address memory) to function as a basis for accessing the second type memory 520. For example, when the controller 530 receives a data writing command with logical address being 0~10000 sectors, the controller 530 directly writes the corresponding data into the block address memory. In allusion to the management system 500, another embodiment is provided for describing a corresponding management method in detail.

Figure 6:
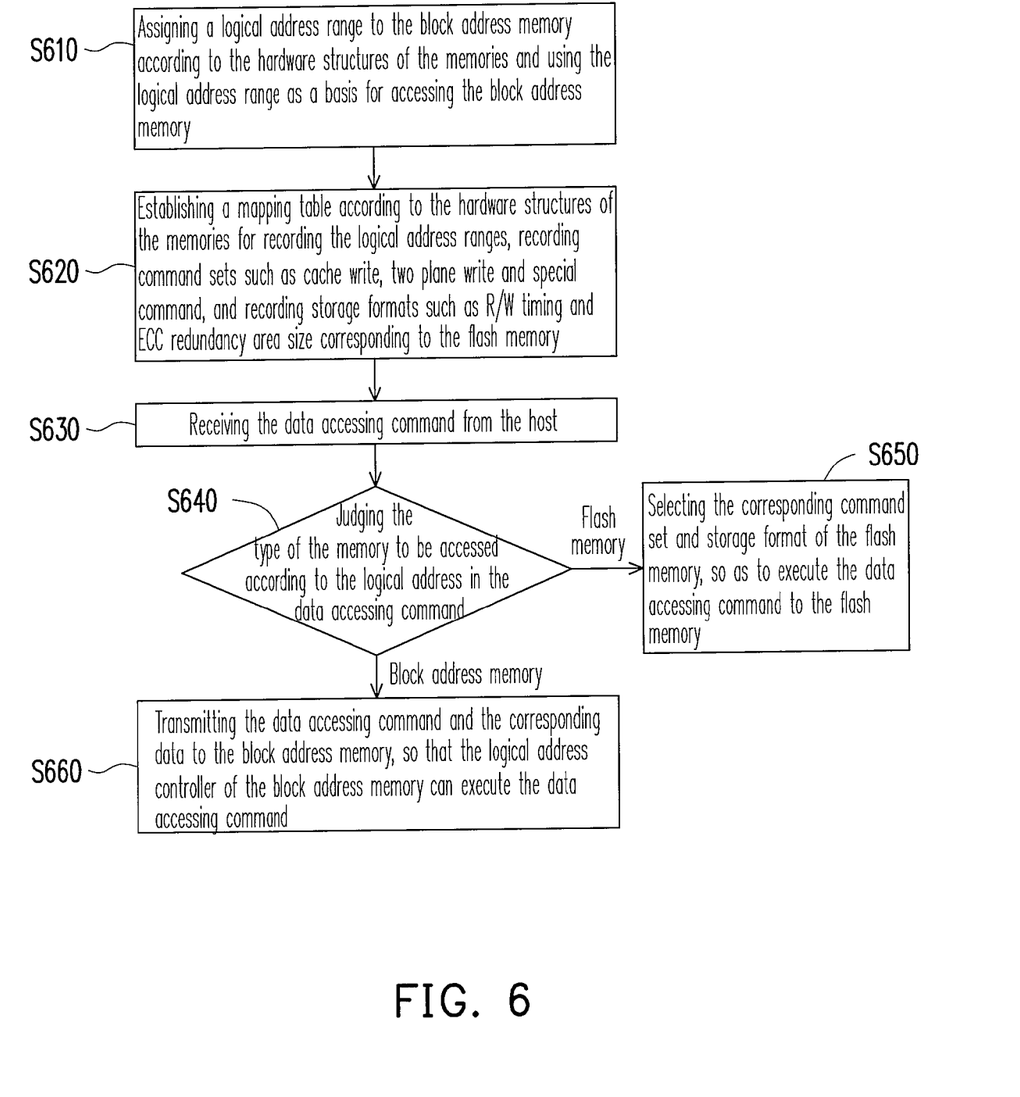
FIG. 6 is a flowchart illustrating a method for managing memories according to an embodiment of the present invention.

FIG. 6 is a flowchart illustrating a method for managing memories according to an embodiment of the present invention. Referring to FIG. 6, the method of the present embodiment is adapted to the management system of the aforementioned embodiment, in which an independent controller is utilized for managing data accessing operations of at least two types of memory. The memories at least include a block address memory. Similarly, for simplicity's sake, only two types of the memory (i.e. the flash memory and the block address memory) are taken as an example hereinafter.

First, the controller assigns a logical address range to the block address memory according to the hardware structures of the memories to function as a basis for accessing the block address memory (S610). Namely, assuming the logical address range assigned to the block address memory is 0~10000 sectors, if a logical address of a received data accessing command falls within such range, it represents the block address memory is about to be accessed, and the data accessing command then can be directly transmitted to the block address memory for execution.

Next, a mapping table is established according to the hardware structures of the memories for recording the logical address range, and meanwhile recording command sets such as cache write, two plane write and special command, etc., and storage formats such as R/W timing and ECC redundancy area size, etc. corresponding to the flash memory (step S620). It should be noted that the mapping table can be built within a memory unit of the controller during manufacturing of the controller.

Each time when the controller receives the data accessing command (step S630), the type of the memory to be accessed can be judged according to the logical address thereof (step S640). If the memory to be accessed is judged to be a flash memory, the corresponding command set and storage format (for example, the accessing command, the R/W timing and the ECC redundancy area size, etc.) of the flash memory are then applied, so as to execute the data accessing command to the flash memory (step S650).

On the other hand, if the memory to be accessed is judged to be the block address memory, the controller then transmits the data accessing command and the corresponding data to the block address memory, so that a logical address controller of the block address memory itself may execute the data accessing command (step S660).

For example, if data is designated to be written into a certain block according to the data accessing command, the controller then finds the corresponding memory type of the block from the mapping table, and transmits the data to the memory for writing. Meanwhile, the controller may also find all information related to such memory type from the mapping table, for example, the aforementioned command sets such as cache write, two plane write and special command, etc., and storage formats such as R/W timing and ECC redundancy area size, etc. By such means, the controller may correctly execute the write operation, and the problems caused by different hardware structures can be resolved.

It should be noted that in the present embodiment, the related command sets and the storage formats (for example, the ECC redundancy area size) of the memory is stored in its own logical address controller of the block address memory. Therefore, repeat recording of such information by the controller of the present invention is unnecessary, and only the command set and the storage format of the other memory (i.e. the flash memory) and the logical address range corresponding to the block address memory are required to be recorded. Similarly, if the controller connects more than two block address memories, the controller may also assign corresponding logical address ranges to the block address memories to function as a basis for data accessing.

Figure 7:
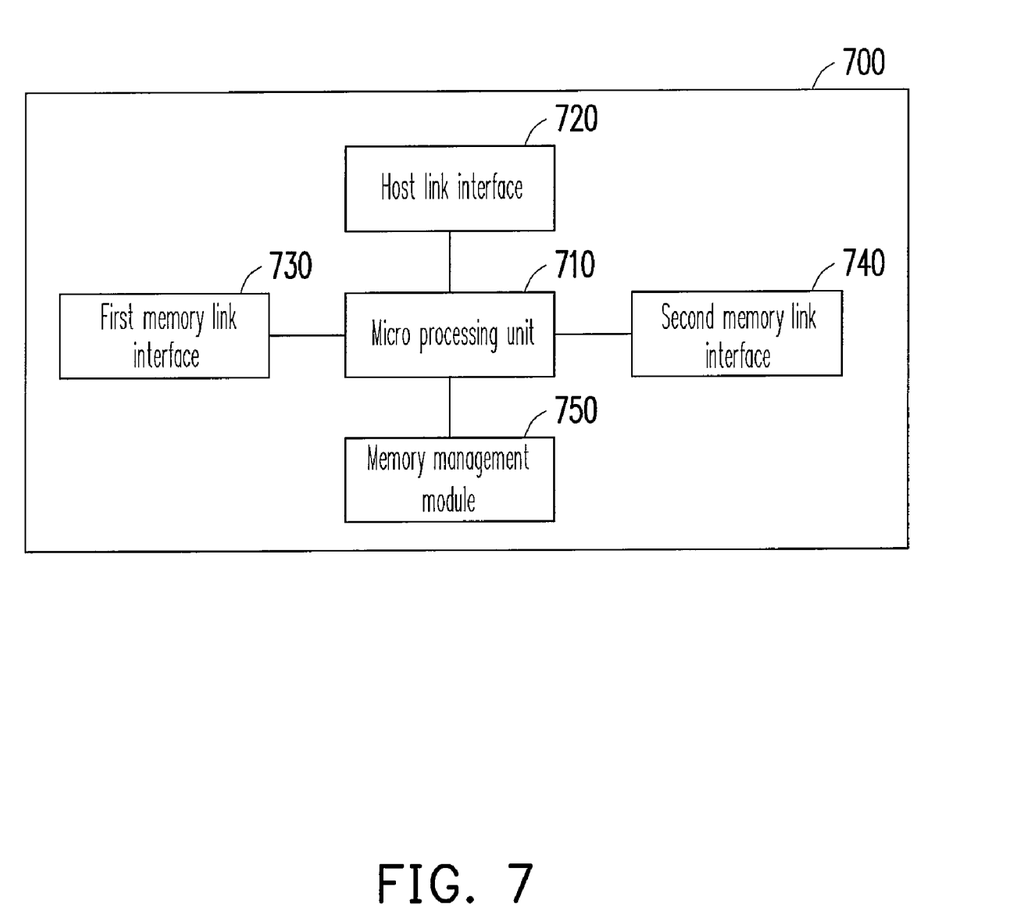
FIG. 7 is a block diagram illustrating a controller according to an embodiment of the present invention.

Based on the aforementioned method for managing memories, the present invention further provides a controller for executing the aforementioned method. FIG. 7 is a block diagram illustrating a controller according to an embodiment of the present invention. Referring to FIG. 7, the controller 700 of the present embodiment is used for managing data accessing operations of the memories, and the controller 700 includes a micro processing unit 710, a host link interface 720, a first memory link interface 730, a second memory link interface 740 and a memory management module 750.

The micro processing unit 710 is, for example, a microprocessor used for controlling operations of the controller 700. The host link interface 720 is used for connecting the controller 700 to an external host. The first memory link interface 730 and the second memory link interface 740 are respectively coupled to the micro processing unit 710 for connecting the controller 700 to external first type and second type memories.

It should be noted that the memory management module 750 is coupled to the micro processing unit 710 for managing data accessing operations of the first type memory and the second type memory via the micro processing unit 710. To be specific, when the micro processing unit 710 receives the data accessing command from the host via the host link interface 720, the memory management module 740 inquires a corresponding data accessing format, a command set, a specification and a logical address range, etc. from the mapping table according to the content of the data accessing command, so as to execute the data accessing command. Detailed method thereof has been described in the aforementioned embodiment, and therefore the related portion will not be repeated.

In summary, in the present invention, the method, the system and the controller for managing the memories apply a single controller to mixingly control different types of flash memory or block address memory, in which by setting all the memories into a compatible format, and recording the information such as data accessing formats, command sets, specifications and logical address ranges of the memories, the problem of incompatibility of the hardware structure can be resolved and different types of flash memory can be simultaneously managed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for managing memories, adapted to a memory module including at least two types of memories, the method comprising:
receiving a data accessing command including a logical address of data to be accessed;
identifying a type of the memory corresponding to the logical address, wherein the memories are selected from one of a combination of a block address memory and a SLC flash memory, a combination of a block address memory and a MLC flash memory, a combination of SLC flash memories having a first capacity and a second capacity, and a combination of MLC flash memories having a third capacity and a fourth capacity, wherein the first capacity is not equal to the second capacity and the third capacity is not equal to the fourth capacity;
executing the data accessing command to the memory according to the logical address and the type of the identified memory; and
adjusting data accessing formats of the memories according to hardware structures of the memories, so as to unify an accessing unit for each data accessing operation when the memory module is one of the combination of SLC flash memories having the first capacity and the second capacity, and the combination of MLC flash memories having the third capacity and the fourth capacity,
wherein the step of adjusting the data accessing formats of the memories so as to unify the accessing unit for each data accessing operation comprises:
uniformly setting number of programs (NOP) of the memories to be 1.

2. The method for managing memories as claimed in claim 1, wherein after the step of adjusting the data accessing formats of the memories, the method further comprises:
establishing a mapping table for recording the adjusted data accessing formats of the memories; and
inquiring the mapping table according to the data accessing command, so as to execute the data accessing command.

3. The method for managing memories as claimed in claim 1, wherein the step of adjusting the data accessing formats of the memories so as to unify the accessing unit for each data accessing operation comprises:
expanding the memories with relatively small accessing units to be compatible with the memory with a relatively large accessing unit based on a merging approach.

4. The method for managing memories as claimed in claim 3, wherein the step of expanding the memories with relatively small accessing units to be compatible with the memory with a relatively large accessing unit based on the merging approach comprises:
when the accessing units of the memories include a 2k page and a 4k page, merging two 2k pages into one 4k page, so as to manage the memory having the 2k page accessing unit.

5. The method for managing memories as claimed in claim 1, wherein if the memories include a block address memory, the method further comprises:
assigning a logical address range to the block address memory to function as a basis for accessing the block address memory.

6. The method for managing memories as claimed in claim 1, further comprising:
recording a command set and a storage format of the memories; and
inquiring the corresponding command set and the storage format for accessing the memories when the data accessing command is received.

7. The method for managing memories as claimed in claim 6, wherein the command set comprises one of cache write, two plane write, special command or combinations thereof, and the storage format comprises one of a R/W timing and an ECC redundancy area size or a combination thereof.

8. A system for managing memories, comprising:
a first type memory;
a second type memory, wherein the first type memory and the second type memory are selected from one of a combination of a block address memory and a SLC flash memory, a combination of a block address memory and a MLC flash memory, a combination of SLC flash memories having a first capacity and a second capacity, and a combination of MLC flash memories having a third capacity and a fourth capacity, wherein the first capacity is not equal to the second capacity, and the third capacity is not equal to the fourth capacity; and
a controller, coupled to the first type memory and the second type memory, for identifying a memory type according to a logical address indicated by a data accessing command, and executing the data accessing command according to the logical address and the identified memory type, and further adjusting data accessing formats of the memories according to hardware structures of the memories, so as to unify an accessing unit for each data accessing operation if the memory module is one of the combination of SLC flash memories having the first capacity and the second capacity, and the combination of MLC flash memories having the third capacity and the fourth capacity,
wherein the controller uniformly sets number of programs (NOP) of the memories to be 1 to adjust the data accessing formats of the memories so as to unify the accessing unit for each data accessing operation.

9. The system for managing memories as claimed in claim 8, wherein the controller further establishes a mapping table for recording the adjusted data accessing formats of the memories, and inquires the mapping table according to the data accessing command, so as to execute the data accessing command.

10. The system for managing memories as claimed in claim 8, wherein if the first type memory and the second type memory comprise the block address memory, the block address memory comprises:
a main memory, comprising a plurality of blocks for storing data; and
a logical address controller, for managing data accessing operations of the blocks according to logical addresses of the blocks recorded in a logical address mapping table.

11. The system for managing memories as claimed in claim 10, wherein the logical address controller finds a block group corresponding to the logical address from the main memory according to the logical address mapping table, wherein the block group comprises a plurality of blocks, and finds the block corresponding to the logical address from the block group according to a sub logical address mapping table, so as to execute the data accessing command.

12. The system for managing memories as claimed in claim 8, wherein if the first type memory and the second type memory comprise the block address memory, the controller further assigns a logical address range to the block address memory to function as a basis for accessing the block address memory.

13. The system for managing memories as claimed in claim 8, wherein the controller further expands the memories with relatively small accessing units to be compatible with the memory with a relatively large accessing unit based on a merging approach.

14. The system for managing memories as claimed in claim 8, wherein the controller further records command sets and storage formats of the first type memory and the second type memory in the mapping table, and inquires the corresponding command set and the storage format stored in the mapping table to access the first type memory or the second type memory when the data accessing command is received.

15. The system for managing memories as claimed in claim 8, wherein pins of the first type memory and the second type memory are the same to that of a flash memory.

16. A controller, comprising:
a micro processing unit, for controlling operations of the controller;
a host link interface, coupled to a host and the micro processing unit;
a first memory link interface, coupled to a first type memory and the micro processing unit;
a second memory link interface, coupled to a second type memory and the micro processing unit, wherein the first type memory and the second type memory are selected from one of a combination of a block address memory and a SLC flash memory, a combination of a block address memory and a MLC flash memory, a combination of SLC flash memories having a first capacity and a second capacity, and a combination of MLC flash memories having a third capacity and a fourth capacity, wherein the first capacity is not equal to the second capacity, and the third capacity is not equal to the fourth capacity; and
a memory management module, coupled to the micro processing unit, for managing data accessing operations of the first type memory and the second type memory via the micro processing unit, wherein
the memory management module identifies a memory type according to a logical address indicated by a data accessing command, and executes the data accessing command according to the logical address and the identified memory type, and further adjusts data accessing formats of the memories according to hardware structures of the memories, so as to unify an accessing unit for each data accessing operation if the memory module is one of the combination of SLC flash memories having the first capacity and the second capacity, and the combination of MLC flash memories having the third capacity and the fourth capacity,
wherein the memory management module uniformly sets number of programs (NOP) of the memories to be 1 to adjust the data accessing formats of the memories so as to unify the accessing unit for each data accessing operation.

17. The controller as claimed in claim 16, wherein the memory management module further establishes a mapping table for recording the adjusted data accessing formats of the memories, and inquires the mapping table according to the data accessing command, so as to execute the data accessing command.

18. The controller as claimed in claim 16, wherein if the first type memory and the second type memory comprise the block address memory, the memory management module further assigns a logical address range to the block address memory to function as a basis for accessing the block address memory.

19. The controller as claimed in claim 16, wherein the memory management module further expands the memories with relatively small accessing units to be compatible with the memory with a relatively large accessing unit based on a merging approach.

* * * * *